United States Patent
McGregor et al.

(10) Patent No.: US 6,801,125 B1
(45) Date of Patent: Oct. 5, 2004

(54) REAR STEERING HITCH/DOCKING MODE

(75) Inventors: Brian D. McGregor, Birch Run, MI (US); Jeffrey T. Klass, Kawkawlin, MI (US); Gordon D. Richardson, Midland, MI (US); Benjamin D. Waghorn, St. Marys (CA)

(73) Assignee: Delphi Technologies, Inc., Troy, MI (US)

( * ) Notice: Subject to any disclaimer, the term of this patent is extended or adjusted under 35 U.S.C. 154(b) by 42 days.

(21) Appl. No.: 10/392,101

(22) Filed: Mar. 19, 2003

(51) Int. Cl.[7] ............................................. G08B 21/00
(52) U.S. Cl. ...................... 340/431; 340/435; 307/10.1; 280/477; 180/168
(58) Field of Search ............................... 340/431, 958, 340/435; 307/10.1; 280/477; 180/167, 168, 169

(56) References Cited

U.S. PATENT DOCUMENTS

| | | | | |
|---|---|---|---|---|
| 3,628,811 A | * | 12/1971 | Rivers | 280/421 |
| 3,834,480 A | * | 9/1974 | McGee | 180/419 |
| 4,955,630 A | * | 9/1990 | Ogren | 280/419 |
| 5,108,123 A | | 4/1992 | Rubenzik | 280/477 |
| 5,191,328 A | | 3/1993 | Nelson | 340/870.06 |
| 5,455,557 A | | 10/1995 | Noll et al. | 340/431 |
| 5,490,075 A | * | 2/1996 | Howard et al. | 701/226 |
| 6,078,849 A | * | 6/2000 | Brady et al. | 701/28 |
| 6,100,795 A | * | 8/2000 | Otterbacher et al. | 340/431 |
| 6,226,570 B1 | * | 5/2001 | Hahn | 701/1 |
| 6,292,094 B1 | * | 9/2001 | Deng et al. | 340/431 |
| 6,411,876 B1 | | 6/2002 | Badenoch | |
| 6,499,558 B2 | | 12/2002 | Lemanski et al. | |
| 6,510,917 B2 | | 1/2003 | Cole | |
| 6,553,293 B1 | | 4/2003 | Hac | |

* cited by examiner

Primary Examiner—Daryl C. Pope
(74) Attorney, Agent, or Firm—Michael D. Smith

(57) ABSTRACT

A system for assisting a driver of a vehicle in precisely reaching a target destination while the vehicle is in reverse. The system comprises a control unit, an HD sensor, a rear wheel steering actuator, and a control positioned for operation by the driver. The HD sensor is in communication with the control unit and measures the relative position of a target location with respect to a location on the vehicle. The rear wheel steering actuator is in communication with the control unit and steers at least a rear wheel of the vehicle. The driver operated control is also in communication with the control unit. The control unit, upon receiving a signal from the control, enters an HD mode in which the control unit operates the rear wheel steering actuator to maneuver the vehicle to bring the target location and the location on the vehicle into alignment.

18 Claims, 2 Drawing Sheets

REAR STEERING HITCH/DOCKING MODE

BACKGROUND

Because the rear hitch or bumper of a vehicle is not normally visible to a driver, hitching trailers to tow vehicles and other docking operations have long been considered a two-person operation. For example, a first person drives the tow vehicle in reverse towards a docking position while a second person provides feedback to the first driver, conveying to the driver feedback in the form of speed and direction to reach the docking position or docking vector information, the docking vector being the direction and distance of the target destination with respect to current location and orientation of the tow vehicle. For example, a helper assisting in hitching a trailer might yell to the driver, "slight left, go slow" or "the trailer hitch is twelve inches (30 cm) back and a few to the right".

Most often, the tow vehicle/trailer hitch connection comprises a spherical joint formed by a steel ball attached at its lower end to a hitch bar extending from the tow vehicle, and a socket, open towards the bottom, that is attached to the trailer. The socket receives and captures the ball, allowing limited relative angular displacement in three degrees of freedom, thereby forming the spherical joint. In order for the disparate parts to mate, they must be properly aligned so that the socket may be lowered over the ball. This is particularly difficult when the trailer is too large or heavy to be handled by an individual. The vehicle must be precisely positioned to mate with the trailer by maneuvering the vehicle to align the ball with the socket. Of course, other types of hitches are known, as well as certain other docking requirements for vehicles. Each of these scenarios requires accurately controlling the vehicle to a docking position while the vehicle is in reverse and the target destination is not visible to the driver. The problem of docking the vehicle to a precise location, therefore, extends beyond trailering, although that may be the most common application.

Prior art attempts at resolving the problem described above have centered on providing visible or audible feedback to the driver during the docking maneuver, thereby allowing the docking operation without the second person providing feedback to the driver. Such systems use various sensors, including, for example, infrared light emitter/detectors, ultrasonic emitter/detectors, and other means for determining alignment of the ball and socket connectors. These devices however, do not provide precise information and still rely on the driver to accurately steer the vehicle to a precise location. Thus, the prior art hitching aids have not been very successful.

SUMMARY

Disclosed is a system for assisting a driver of a vehicle in precisely reaching a target destination while the vehicle is in reverse. The system comprises a control unit, a hitch/docking (HD) sensor, a rear wheel steering actuator, and a control positioned for operation by the driver. The HD sensor is in communication with the control unit and measures the relative position of a target location with respect to a location on the vehicle. The rear wheel steering actuator is in communication with the control unit and steers at least a rear wheel of the vehicle. The driver operated control is also in communication with the control unit. The control unit, upon receiving a signal from the control, enters an HD mode in which the control unit operates the rear wheel steering actuator to maneuver the vehicle to bring the target location and the location on the vehicle into alignment.

The above described and other features are exemplified by the following figures and detailed description.

BRIEF DESCRIPTION OF THE DRAWINGS

Referring now to the figures, which are exemplary embodiments, and wherein the like elements are numbered alike.

DETAILED DESCRIPTION

Figure 1:
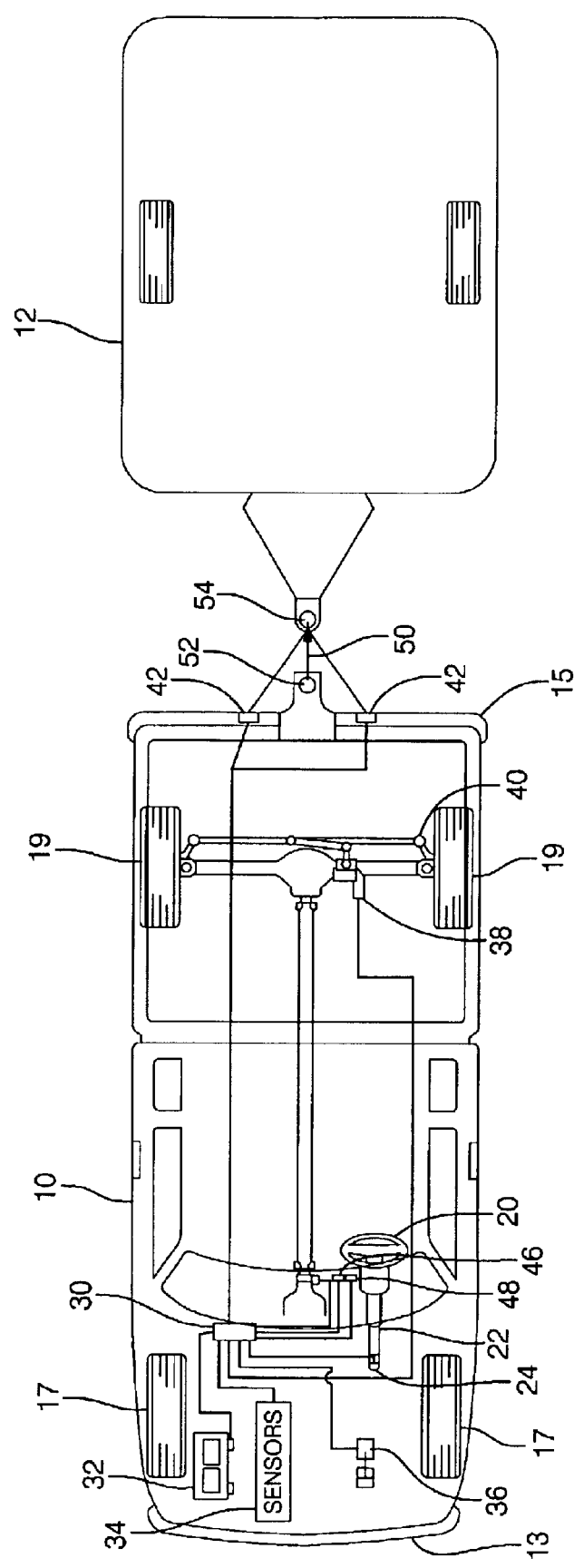
FIG. 1 shows a vehicle incorporating a rear-steer docking system in docking relation to a trailer.

FIG. 1 shows a vehicle 10 incorporating a rear-steer docking system in docking relation to a trailer 12. Vehicle 10 is a four-wheel vehicle in which each of the two axles has two steerable wheels. Thus, a front axle at a front 13 of vehicle 10 has front wheels 17 which are steerable and a rear axle at a rear 15 has rear wheels 19 that are also steerable. Front wheels 17 are steerable in any known manner, such as by assisted mechanical connection (not shown) to hand wheel 20. Hand wheel 20 is connected to steering column 22, which includes an angular position sensor 24 that detects the angular position of hand wheel 20 and sends this information electronically to control unit 30.

Control unit 30 is powered by battery 32. Control unit 30 is in electronic communication with various vehicular systems including sensors 34, brake piston actuator 36 and steering actuator 38. Sensors 34 include such things as transmission sensor for detecting a gear currently engaged in the vehicle transmission or transaxle, speedometer sensor, brake sensor, and ignition sensor. Thus, control unit 30 is made aware of the condition of many vehicle systems as will be further described below. Brake piston actuator 36 may be provided as part of an anti-lock brake system (not shown) or provided specifically for automated vehicle control as described herein or otherwise. Steering actuator 38 is in mechanical communication with transverse steering bar 40, which controls the steering angle of rear wheels 19 in a known manner.

Control unit 30 is responsible for providing various rear wheel steering modes for controlling rear wheel steering during normal driving. Four wheel steering is known for improving drivability at high speeds and maneuverability at low speeds. See, for example, commonly-assigned U.S. Pat. No. 6,411,876 issued Jun. 25, 2002 to Badenoch.

Control unit 30 is also in electronic communication with hitch/docking (RD) sensor(s) 42, dashboard control 46 and driver feedback device 48. HD sensor(s) 42 are any known type of sensor as described hereinbelow or otherwise for detecting the relative position of the target docking point and rear 15 of the vehicle. For example, HD sensor(s) 42 may detect the docking vector 50 from hitch ball 52 to socket 54. Dashboard control 46 may include a button, knob, or other driver-actuable control for engaging an automated hitching/docking (HD) system. Feedback device 48 is a light, display, speaker, or other device for providing driver confirmation of engagement, abort, and/or completion of an automated HD procedure.

HD sensor(s) 42 may be any of various proximity sensors. In one embodiment, string potentiometers are used. String potentiometers are a well-understood sensing technology in which the amount of extension of an extensible-retractable cable is accurately measured. By using two string potentiometers, the precise position of socket 54 with respect to hitch ball 52 can be measured using a simple triangulation technique, once the system is calibrated and knows the location of hitch ball 52 with respect to HD sensors 42. Other known displacement or proximity sensors such as those that rely on technologies including single or multiple string potentiometer (pot), resistive, magnetic, optical, electromagnetic, radio frequency, infrared, electromechanical, laser, or collision avoidance sensors. In addition, the sensor or sensors may be implemented using wired or wireless technologies.

Figure 2:
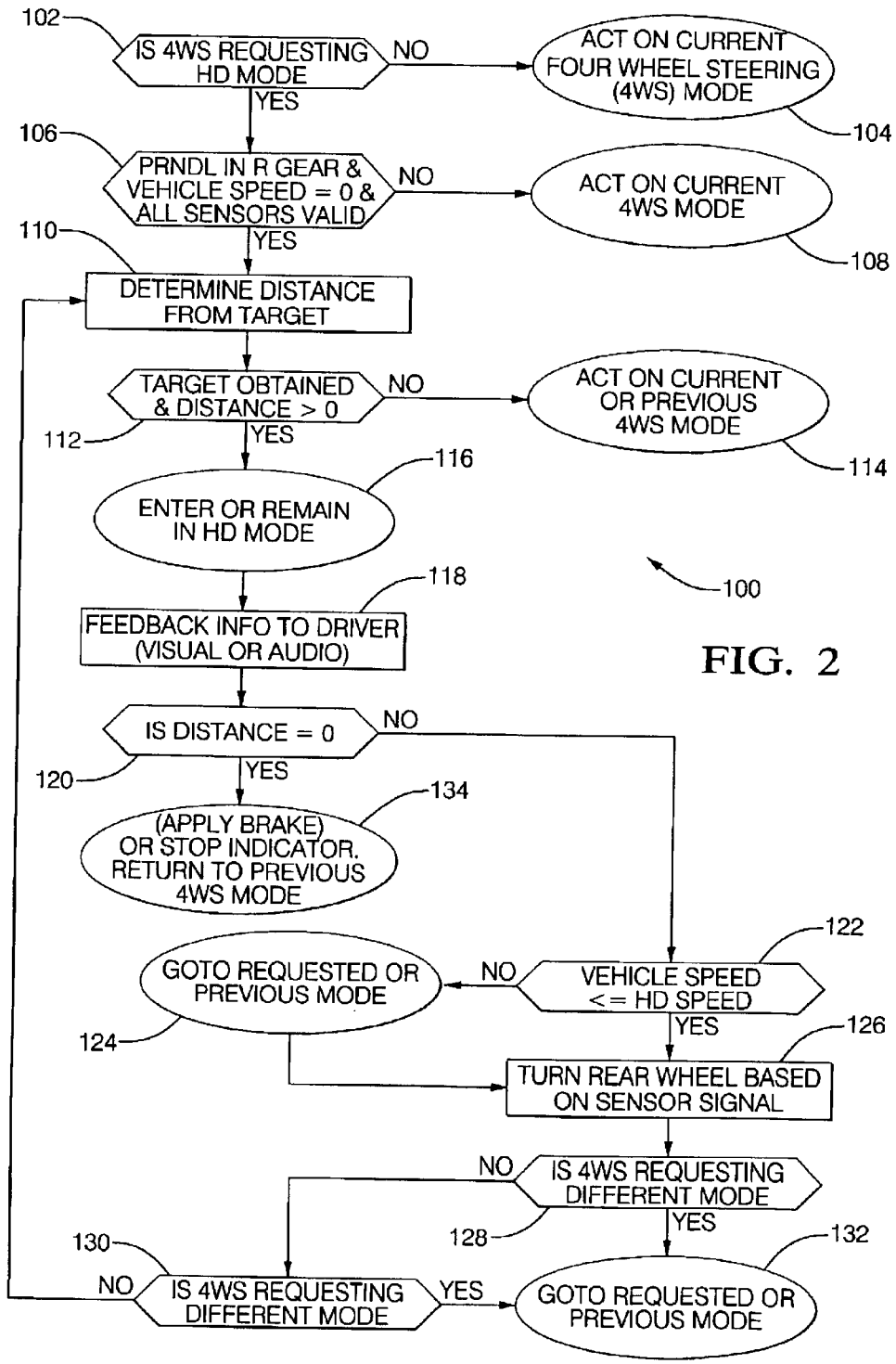
FIG. 2 shows a flow chart implementing an automated hitch/docking system.

The operation of the automated HD system will now be described with reference to FIGS. 1 and 2. FIG. 2 shows a flow chart 100 depicting an exemplary method carrying out the automated HD procedure. Starting at query block 102, it is determined whether the four wheel steering system (4WS) is requesting the HD mode. Such a request may occur, for example, upon the driver actuating dashboard control 46, indicating that the driver is desirous of engaging the automated HD system.

If the 4WS system has made no such request, then control proceeds to box 104 in which the current 4WS mode is maintained.

However, if the 4WS system has requested HD mode, then control proceeds to query block 106 in which it is determined whether the automatic transmission is in REVERSE, SPEED=0, and that the sensors are valid. If not, the HD mode is not engaged and current 4WS mode is maintained at block 108.

However, if the automatic transmission is in REVERSE, SPEED=0, valid sensors then control proceeds to block 110 in which the docking vector 50 is measured. It may also be desirable at this point to ensure that the hand wheel is at an approximate center position. Control would proceed therefore to query block 112 only where the transmission is in REVERSE and the hand wheel is centered.

At query block 112, control unit 30 determines based on the docking vector and knowledge of the region of obtainable targets whether the particular target in question is obtainable. Targets are not obtainable, for instance, where they are too far off to one side or there is some error in the sensor output. For example, if the sensors are string potentiometers (pot) and they are not extended at all, this would indicate an impossible target. Similarly, if one string pot is much more extended than the second string pot, this would indicate that the target location requires that the driver first pull forward, thereby placing the target "in range" of a back-up plus steering maneuver.

If control unit 30 determines that the docking target is not in range, control proceeds to block 114 in which the current or previous 4WS mode is maintained. However, if control unit 30 determines that the docking target is within range, control proceeds to control block 116 in which HD mode is engaged. Control then proceeds to block 118.

At block 118, feedback confirming that HD mode is engaged is provided to the driver. For example, driver feedback device 48 lights a message, changes a display, and/or provides audible feedback to driver. Control then proceeds to query block 120.

At query block 120, the distance to target is again determined. If the target distance is zero, then the brake is applied or the driver is signaled to stop the vehicle at block 134. If the target distance is greater than zero, control proceeds to query block 122.

At query block 122, the vehicle speed is determined. If the vehicle speed is greater than a selected maximum safe HD speed, e.g., 3 miles per hour, then control proceeds to block 124 in which the vehicle brake is applied to slow the vehicle, and/or the rear steer angle is limited based on vehicle speed and control proceeds to block 126. If the vehicle speed is considered safe, i.e., equal to or less than the selected maximum safe HD speed, then control proceeds directly to block 126.

At block 126, rear wheels 19 are steered based upon the docking vector angle and target distance determined from HD sensors 42. For example, an algorithm or look-up table correlating the angle between docking vector 50 relative to the longitudinal axis of the tow vehicle to desired rear wheel steer in an automated vehicular docking system may be devised. Upon determining the appropriate rear steer amount and initiating rear steer towards said amount, control proceeds to query block 128.

At query block 128, it is determined whether the 4WS system is requesting a different mode. For example, if the driver presses the brake pedal, changes the transmission gear out of reverse, turns hand wheel beyond a selected threshold, presses an abort button on the dashboard, e.g., by dashboard control 48, or otherwise aborts the automated HD procedure, query block 128 will determine that the 4WS is requesting a different mode.

If control unit 30 determines that a different mode is being selected, then HD control aborts and the 4WS enters the requested or previous 4WS mode. However, if control unit 30 determines that HD mode should remain active, control proceeds to query block 130.

At query block 130, all vehicle sensors are validated and the target distance and angle is again calculated to ensure that the RD procedure is operating according to the design intentions. Again, if any sensor output is deemed invalid or other parameter such as vehicle speed exceeds a selected threshold, then control proceeds to block 132 where automated HD aborts. Otherwise, control proceeds back to step 10 described above.

While the invention has been described with reference to an exemplary embodiment, it will be understood by those skilled in the art that various changes may be made and equivalents may be substituted for elements thereof without departing from the scope of the invention. For example, the feedback device may provide a real time digital display or audible reading of the number of inches or centimeters from the target. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A system for assisting a driver of a vehicle in precisely reaching a target destination while said vehicle is in reverse, said system comprising:

a control unit;

an HD sensor, said HD sensor measuring the relative position of a target location with respect to a location on said vehicle, said HD sensor in communication with said control unit;

a rear wheel steering actuator for steering at least a rear wheel of said vehicle, said rear wheel steering actuator being in communication with said control unit;

a control positioned for operation by said driver, said control being in communication with said control unit;

said control unit, upon receiving a signal from said control, enters an HD mode in which said control operates said rear wheel steering actuator to maneuver said vehicle to bring said target location and said location on said vehicle into alignment.

2. The system of claim 1, further comprising:

a driver feedback device in communication with said control unit, said control unit signaling said feedback device to instruct the driver to stop rearward motion of the vehicle when said target location and said location on said vehicle are aligned.

3. The system of claim 2 wherein said feedback device comprises at least one of an audible feedback device and a visible feedback device.

4. The system of claim 1, further comprising:

a brake piston actuator in communication with said control unit, said control unit signaling said brake piston actuator to stop rearward motion of the vehicle when said target location and said location on said vehicle are aligned.

5. The system of claim 4 wherein said brake piston actuator also operates in response to an anti-lock brake system controller.

6. The system of claim 1 wherein said HD sensor comprises at least one string potentiometer.

7. The system of claim 1, said control unit entering said HD mode only after determining that a speed of said vehicle is zero and a transmission of said vehicle is in REVERSE.

8. The system of claim 1 wherein said control comprises a button.

9. The system of claim 1, said control unit entering said HD mode only after determining that the target is obtainable from a current position and orientation of the vehicle.

10. A method for aligning a location on a vehicle with a target location comprising:

receiving a signal from a control actuated by a driver;

using an HD sensor to measure the relative position of said target location with respect to said location on said vehicle;

entering an HD mode in response to said signal and said HD sensor, wherein, in said HD mode, a control unit operates a rear wheel steering actuator to maneuver said vehicle to bring said target location and said location on said vehicle into alignment.

11. The method of claim 10 further comprising providing driver feedback instructing the driver to stop rearward motion of the vehicle when said target location and said location on said vehicle are aligned.

12. The method of claim 11 wherein said driver feedback comprises at least one of audible feedback and visible feedback.

13. The method of claim 10, further comprising:

actuating a brake piston actuator to stop rearward motion of the vehicle when said target location and said location on said vehicle are aligned.

14. The method of claim 13 wherein said brake piston actuator also operates in response to an anti-lock brake system controller.

15. The method of claim 10 wherein said HD sensor comprises at least one string potentiometer or other sensing method.

16. The method of claim 10 further comprising:

determining that a speed of said vehicle is zero and a transmission of said vehicle is in REVERSE prior to entering said HD mode.

17. The method of claim 10 wherein said control comprises a button.

18. The method of claim 10 further comprising determining that a target is obtainable from a current position and orientation of the vehicle prior to said entering said HD mode.

* * * * *